(No Model.)
C. CARTER, A. H. BELL & C. T. BOEHM.
APPARATUS FOR PRECIPITATING GOLD AND SILVER FROM CYANIDE SOLUTIONS.
No. 513,174.        Patented Jan. 23, 1894.
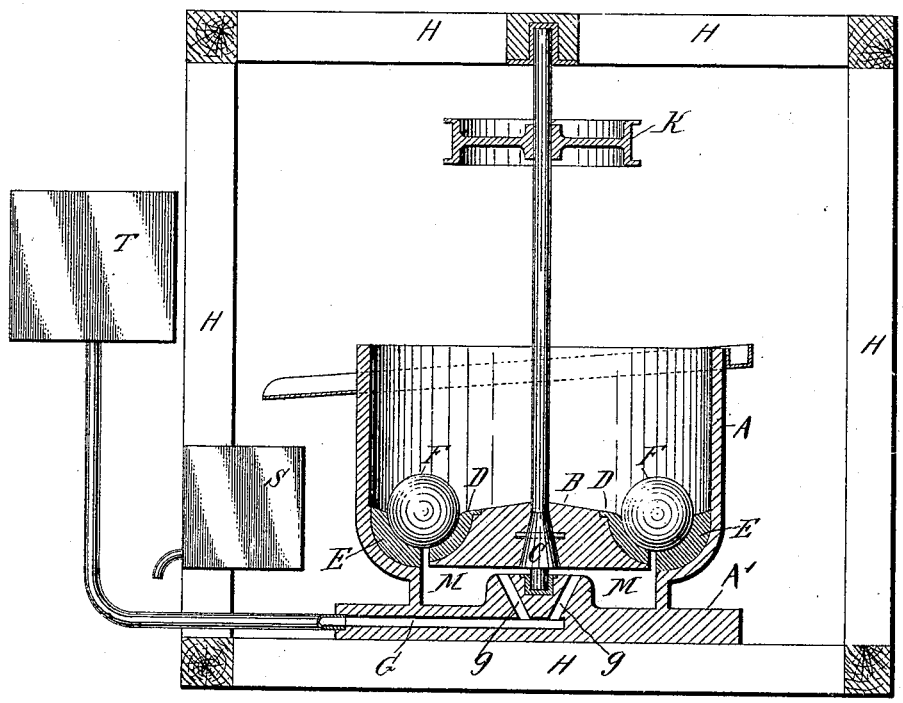

UNITED STATES PATENT OFFICE.

CHARLES CARTER AND ALFRED H. BELL, OF TOOELE COUNTY, UTAH TERRITORY, AND CARL T. BOEHM, OF NEW YORK, N. Y.

APPARATUS FOR PRECIPITATING GOLD AND SILVER FROM CYANIDE SOLUTIONS.

SPECIFICATION forming part of Letters Patent No. 513,174, dated January 23, 1894.

Application filed March 27, 1893. Serial No. 467,720. (No model.)

*To all whom it may concern:*

Be it known that we, CHARLES CARTER and ALFRED H. BELL, residing in the county of Tooele, in the Territory of Utah, and CARL T. BOEHM, residing at New York, in the county of New York and State of New York, have invented certain new and useful Improvements in Apparatus for Precipitating Gold and Silver from Cyanide Solutions, of which the following is a full, clear, and exact description, reference being had to the accompanying drawing, and to the letters of reference marked thereon.

Our invention relates to the mechanical means for effecting the precipitation of gold and silver from cyanide solutions. It is well known that a weak solution of cyanogen will dissolve gold and silver and leave the base metals practically undissolved; the precious metals contained in the solution are precipitated by passing through zinc. Generally this is accomplished by means of zinc shavings which as soon as covered with the precious metals have to be smelted into bars and then refined. In our device the solution passes up slowly through a pipe leading to a settling chamber and thence to zinc balls traveling in a zinc pathway, so that as fast as the metals are deposited on the zinc balls or rings they are rubbed off and descend into the settling chamber by gravitation.

The device illustrated in the accompanying drawing is intended to overcome the objections and embody the advantages above set forth.

It should be noted that the device is not intended for pulverization but simply to bring about complete precipitation of the precious metals. To this end (referring to the drawing) it consists of a circular vessel or receptacle A. provided with a base A'. having a central seat $c$ for the reception of a driving shaft C. The base has a footstep as shown so as to provide an annular recess or chamber M. into which the solution is forced by gravity and which serves as a receptacle for the precipitate, as will be hereinafter set forth. At one side of the center of the base a groove G. is bored out (or an integral opening is left when cast) to form a channel for the passage of the solution through openings $g$, to the chamber M.

The driving shaft C. has secured to it (integral or keyed thereto) a disk B. having a zinc ring or plate D. secured thereto. Opposite this ring and secured to the lower part of the vessel A is another ring of zinc E. These rings do not meet but have a space left between them for the passage of the solution into the body of the receptacle A. Resting on these rings are zinc balls F. as many as may be deemed advantageous. The solution enters the channel G. from the tank T. and passes upward through the opening $g$ into the chamber M. and thence between the zinc rings E. F. into the vessel A. Motion is imparted to shaft C. by a suitable pulley K. and this in turn imparts a motion of rotation and translation to the balls. This motion of the balls in contact with the rings tends to keep the balls and rings constantly clear of the precipitate and therefore bright, as well as to throw the fine particles of zinc into suspension by friction. This suspension of the zinc particles is absolutely necessary in the complete precipitation of the small traces of gold and silver in solution. As the vessel A. becomes filled the overflow passes off to a filter S. from whence it is conducted back to the solution tank. It is obvious that the solution in the vessel A is kept in a state of agitation and as particles of zinc are thrown off by wearing contact of the balls and rings there is greater opportunity to precipitate small traces of gold and silver in solution. The precipitate gradually settles in the chamber M and is taken out at suitable intervals.

Having thus described our invention, what we claim as new, and desire to secure by Letters Patent, is—

1. The method of precipitating gold and silver from solution which consists in causing the solution to rise up against and between movable and stationary zinc surfaces, and keeping the solution while in such contact in a state of agitation and the zinc surfaces bright by friction.

2. In a device of the nature set forth, the combination with a solution vessel having a base provided with openings for the passage of the solution to the vessel and a precipitate chamber, of a zinc ring or path, a revolving disk also provided with a zinc ring or path, and zinc balls moving upon such rings or paths, substantially, as herein stated.

3. In a device for the precipitation of gold and silver from solution as set forth, the combination of a vessel having a base and zinc path as described, a revolving disk also provided with a zinc path, said paths not being in contact, to allow the precipitate to fall between, and a series of zinc balls moving on said zinc paths, whereby the solution is kept in agitation and the paths and balls kept bright and free from precipitate, and particles of zinc are thrown into suspension, substantially as herein stated.

In testimony whereof we have hereunto set our names in presence of subscribing witnesses.

CHARLES CARTER.
ALFRED H. BELL.
CARL T. BOEHM.

Witnesses as to the signatures of Charles Carter and Alfred H. Bell:
CHAS. FELT,
FRED SNIVELY.

Witnesses as to the signature of Carl T. Boehm:
L. A. CHASE,
I. H. MACDONALD.